United States Patent [19]

Beyda et al.

[11] Patent Number: 6,148,294

[45] Date of Patent: *Nov. 14, 2000

[54] SYSTEM AND METHOD FOR COMPUTER DIRECTORY UPDATING AND PRESENTATION BASED ON FREQUENCY OF ACCESS

[75] Inventors: William Joseph Beyda, Cupertino; Gregory Noel, Menlo Park, both of Calif.

[73] Assignee: Siemens Information and Communication Networks, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/771,743

[22] Filed: Dec. 20, 1996

[51] Int. Cl.⁷ .................................................. G06F 17/30
[52] U.S. Cl. .................. 707/1; 707/3; 707/6; 707/100; 707/500; 707/515
[58] Field of Search ............................ 364/282.3, 283.1, 364/222.81, 286, 280; 707/1, 100, 500, 515, 3, 6

[56] References Cited

U.S. PATENT DOCUMENTS

| | | | |
|---|---|---|---|
| 5,012,405 | 4/1991 | Nishikado et al. ................. | 364/200 |
| 5,091,852 | 2/1992 | Tsuchida et al. ................... | 707/6 |
| 5,276,874 | 1/1994 | Thomson .............................. | 707/1 |
| 5,313,646 | 5/1994 | Hendricks et al. ................. | 707/1 |
| 5,355,497 | 10/1994 | Levy ..................................... | 395/700 |
| 5,394,382 | 2/1995 | Hu et al. .............................. | 707/1 |
| 5,423,034 | 6/1995 | Cohen et al. ........................ | 707/1 |
| 5,428,778 | 6/1995 | Brookes ............................... | 707/1 |
| 5,499,221 | 3/1996 | Ito et al. ............................... | 369/32 |
| 5,544,360 | 8/1996 | Lewak et al. ........................ | 707/1 |
| 5,546,581 | 8/1996 | McKinnis et al. .................. | 395/684 |
| 5,566,328 | 10/1996 | Eastep ................................. | 707/1 |
| 5,592,662 | 1/1997 | Sawada et al. ...................... | 707/1 |
| 5,655,088 | 8/1997 | Midorikawa et al. .............. | 395/327 |
| 5,737,556 | 4/1998 | Yasunaga ............................. | 395/339 |

OTHER PUBLICATIONS

Debra Niedermiller "Novell NetWare" pp. 397–398, Jan. 1992.

*Primary Examiner*—Hosain T. Alam
*Assistant Examiner*—Jean M. Corrielus

[57] ABSTRACT

A computer system 200 having a hierarchical file directory system in which a user's patterns of use are analyzed when the user calls a file access routine such that the system tracks 904 which directories and files are accessed most frequently by the user when in a particular application 906. Upon the user accessing a particular application, the system then presents the user with a list of files or directories 908, 910 in order of most likely use from the particular application.

11 Claims, 7 Drawing Sheets

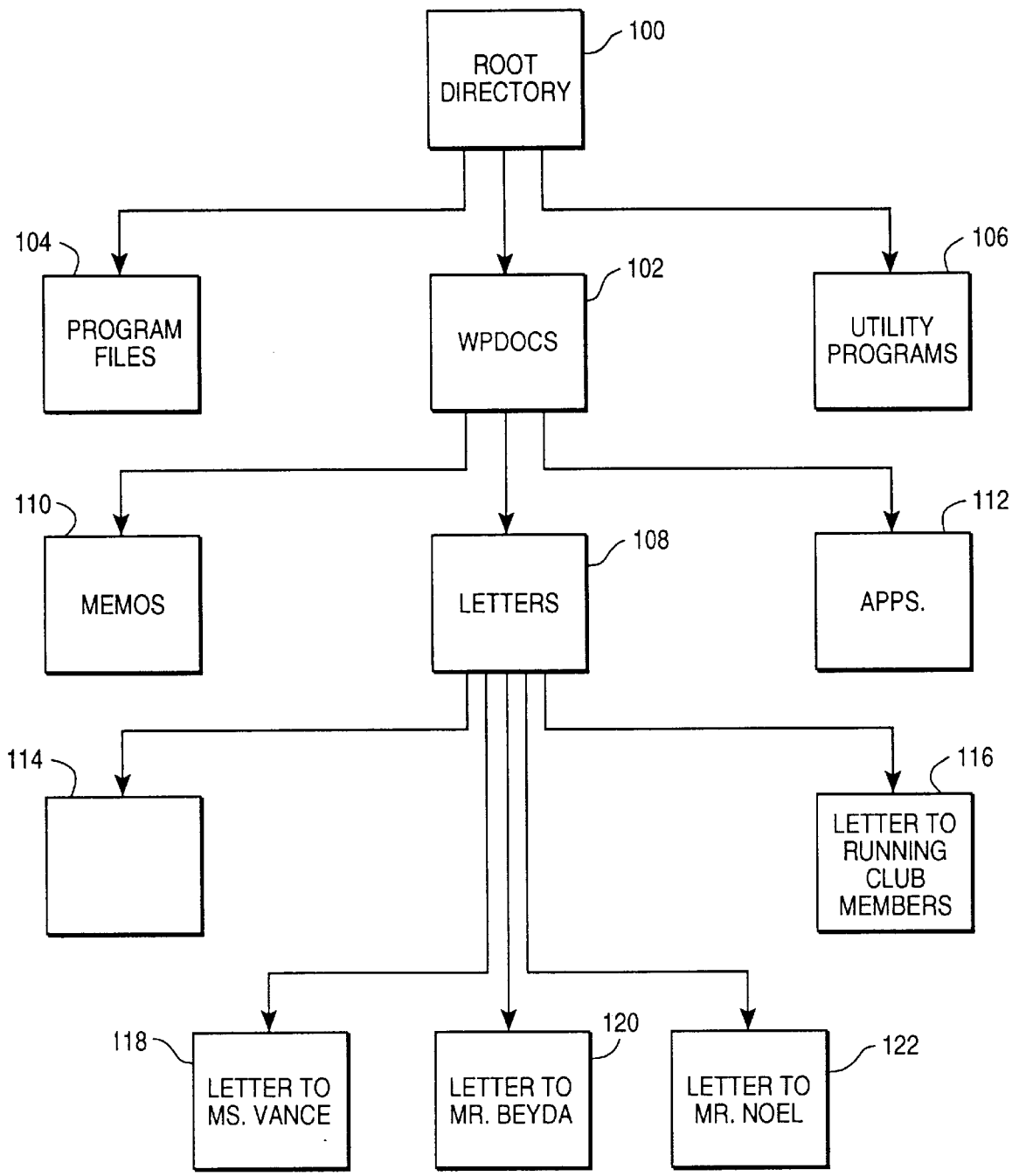
FIG_1
(PRIOR ART)

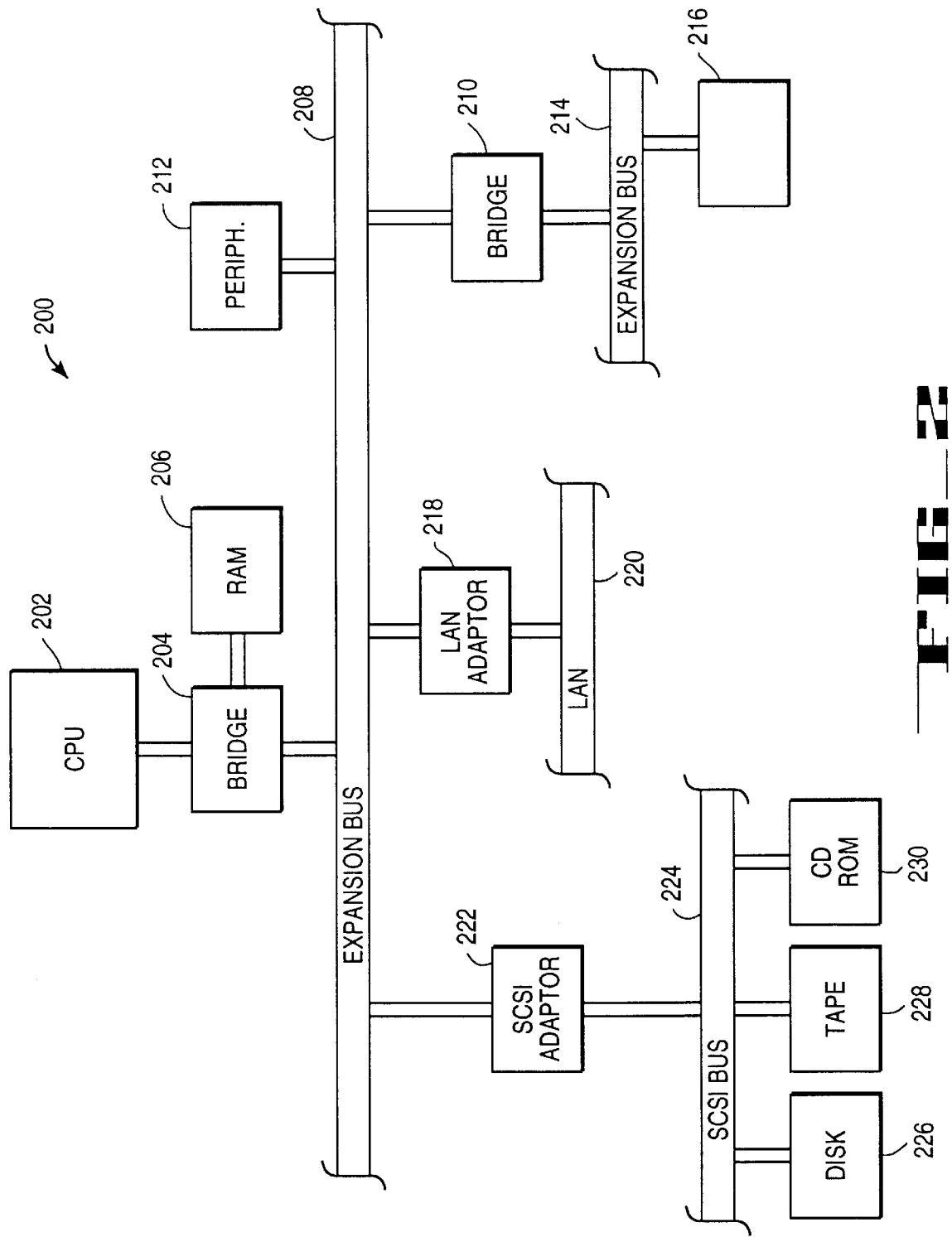
FIG_2

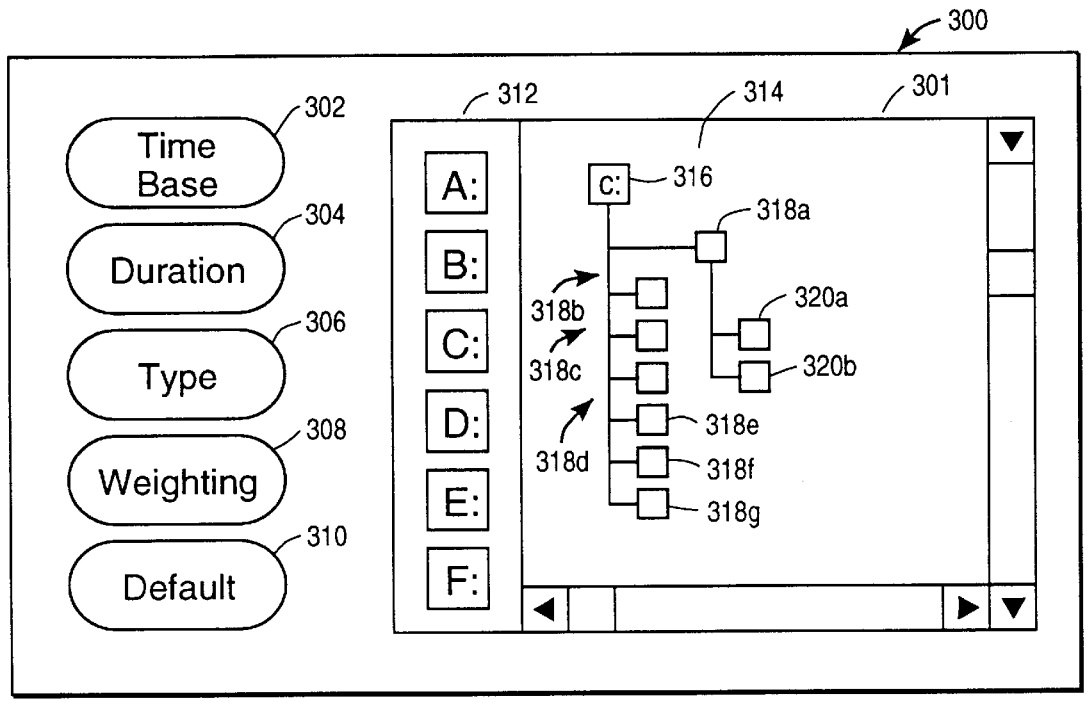
FIG_3
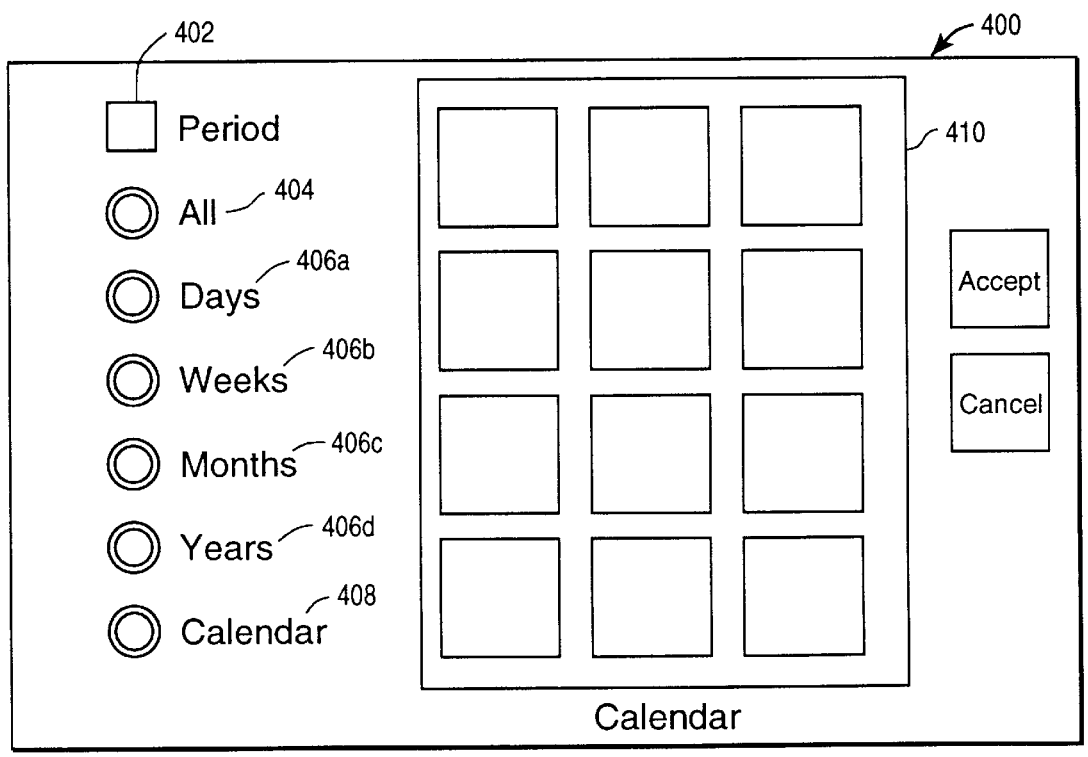
FIG_4

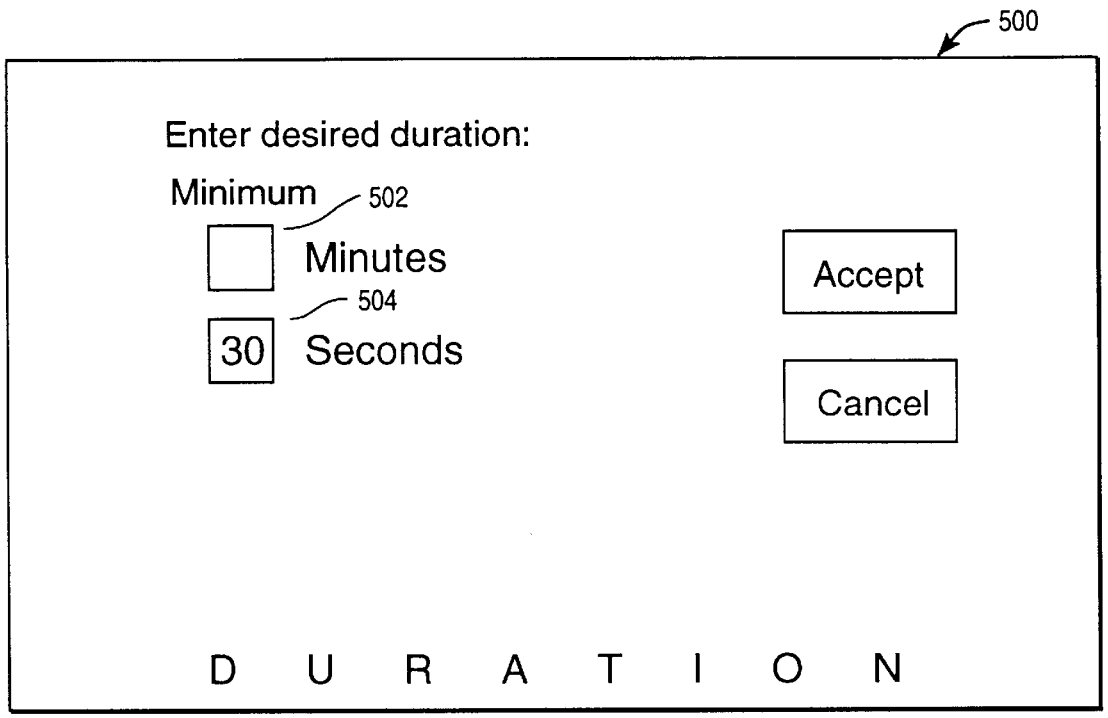
FIG_5
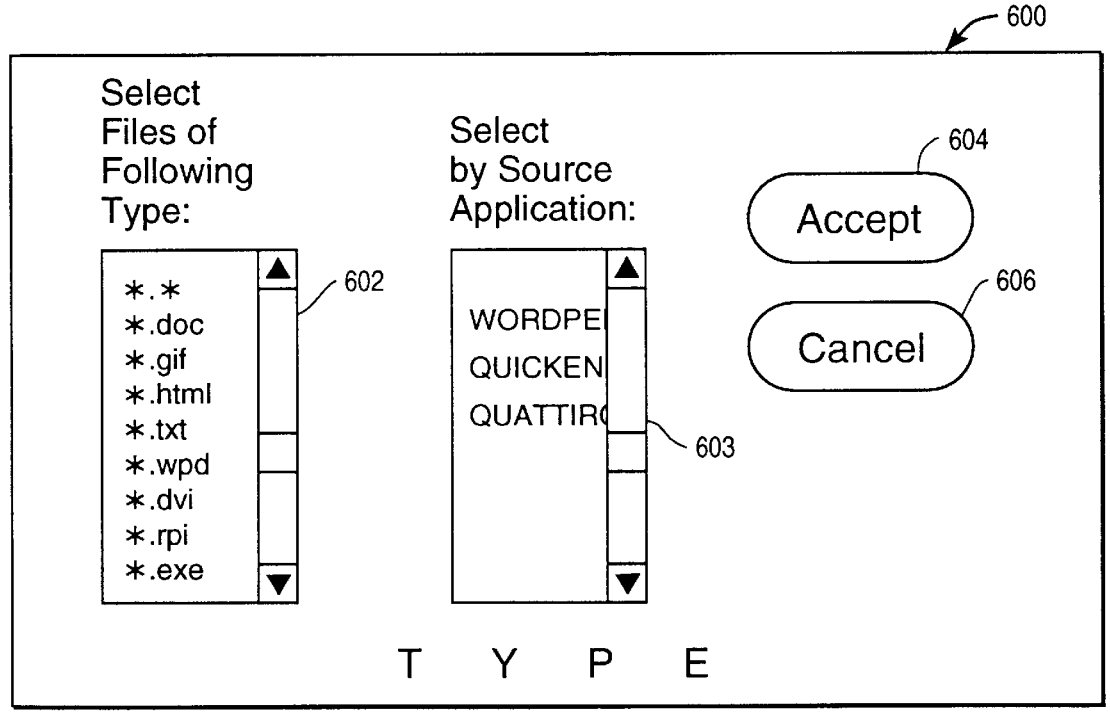
FIG_6

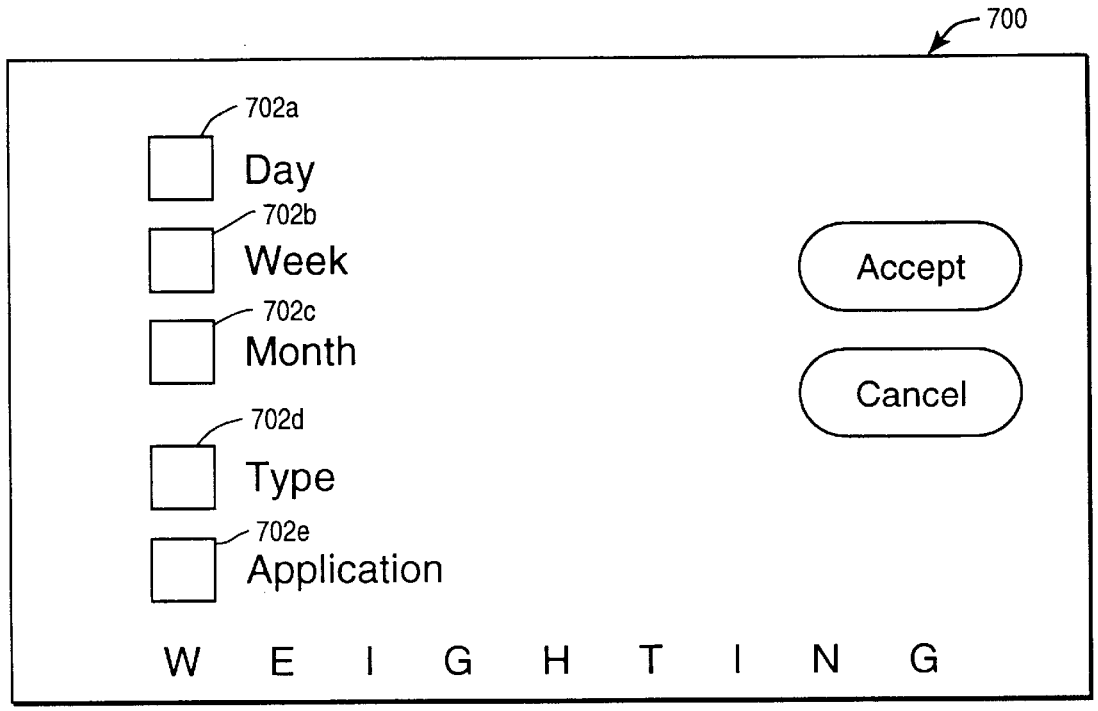
FIG_7
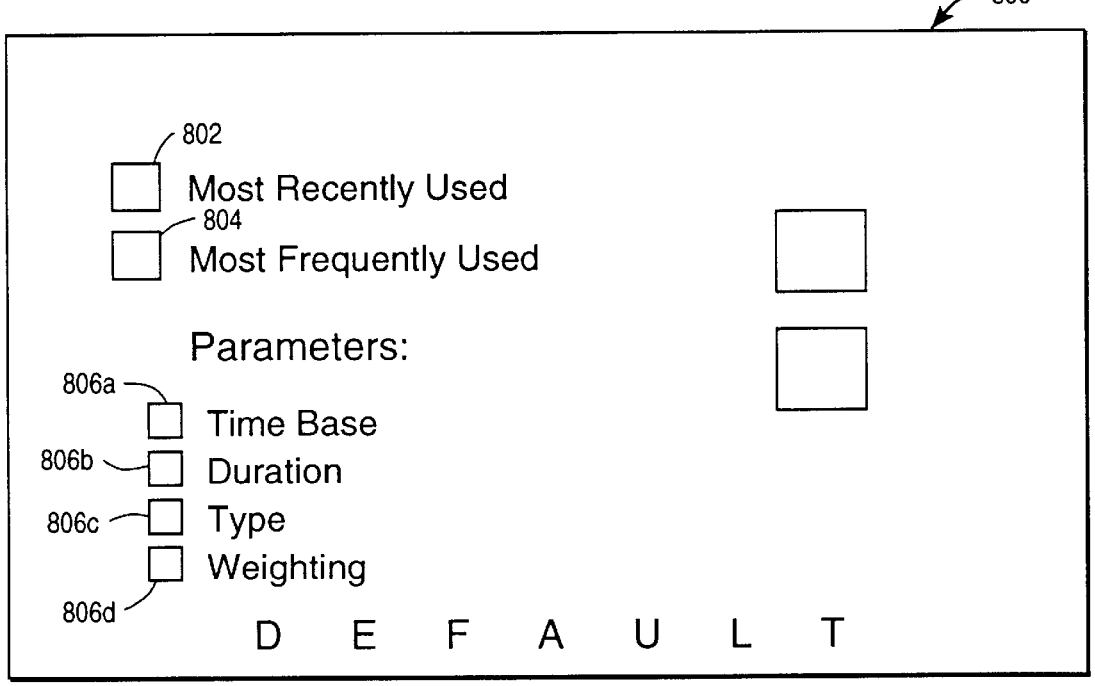
FIG_8

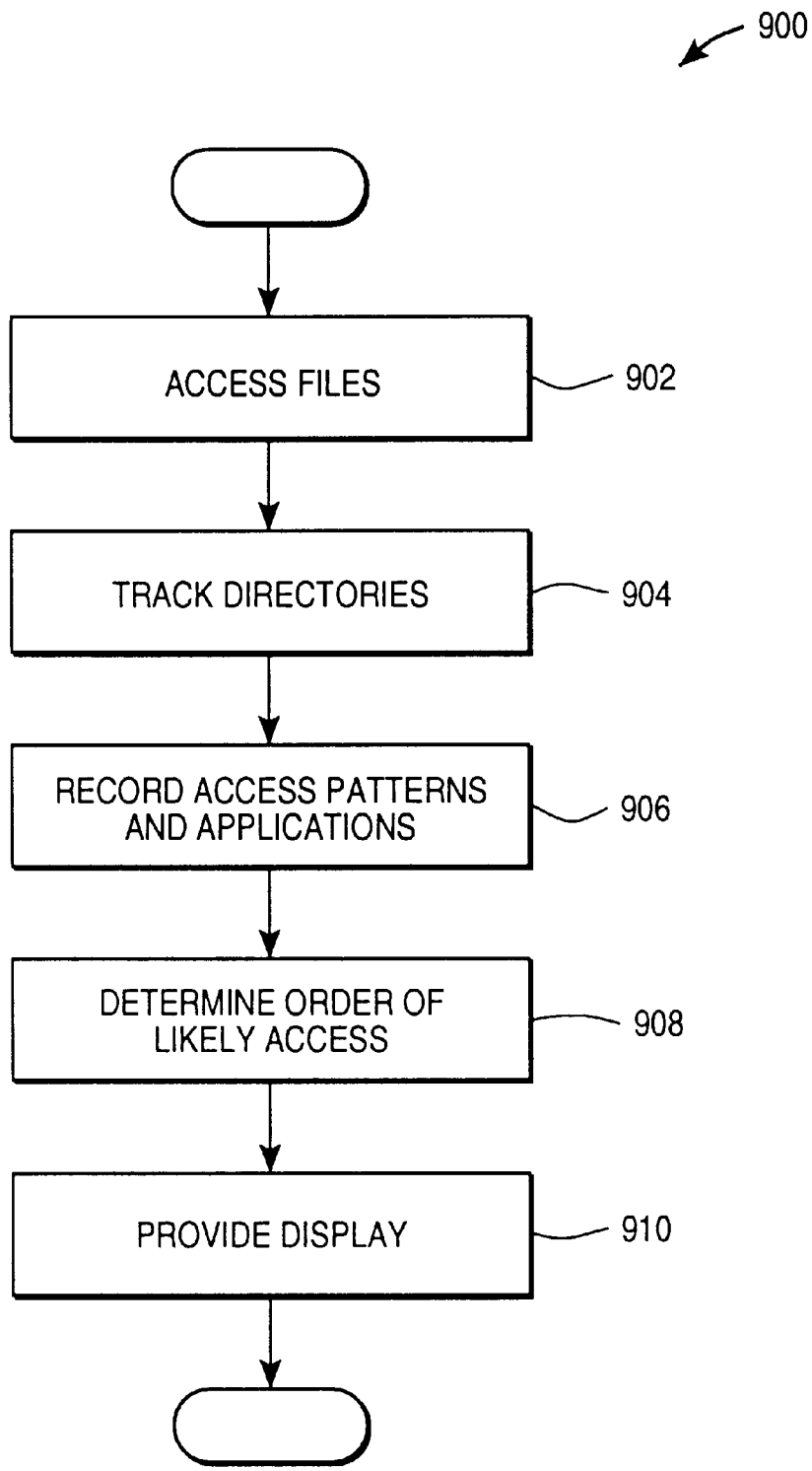
FIG_9

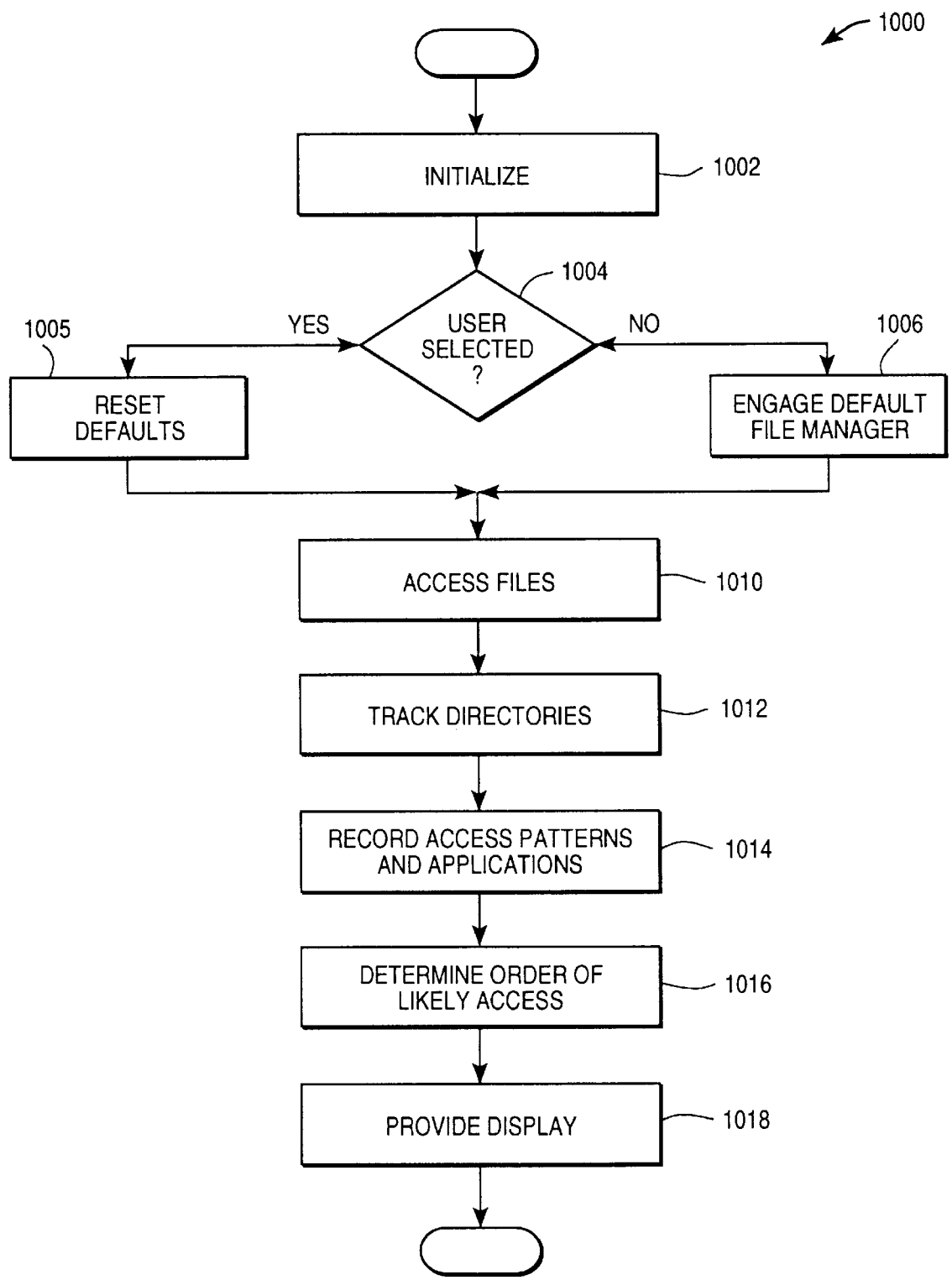
FIG_10

SYSTEM AND METHOD FOR COMPUTER DIRECTORY UPDATING AND PRESENTATION BASED ON FREQUENCY OF ACCESS

BACKGROUND OF THE INVENTION

1. Field of the Invention

The present invention relates to computer directories and, more particularly, to an apparatus and method for adaptive computer directory and file selection.

2. Description of the Related Art

Many computer file control systems employ a hierarchical filing structure which organizes data into files and directories. Directories may contain other directories, referred to as subdirectories, and/or files.

FIG. 1 shows a simplified typical hierarchical tree-type directory structure. This structure is called a "tree" because it resembles an upside down tree with the base or "root" of the tree at the top. Subdirectories are often referred to as "branches" of the tree and files are often referred to as "leaves" of the tree.

In FIG. 1, the root directory 100 contains a number of subdirectories 102–112 and files 114–122. The subdirectories 102–112 may contain other subdirectories and files and so on. In typical use, directories often contain files having similar kinds of data. The name of the directory is typically selected to be descriptive of the kinds of files and directories therein. For example, a WPDOCS directory 102 contains word processing documents and directories for holding specific categories of such documents. For example, a letters subdirectory 108 may contain only files which are letters. Memos could be stored in a memos subdirectory 110, patent applications in an applications subdirectory 112, and so on.

Custom structures of such directories are created to make the storing and retrieval of the files convenient. If the number of files stored is small and the number of different file kinds is either small or very well defined, this type of file storage structure works well. However, several problems arise when the number of files becomes large.

More particularly, many computer operating systems and applications programs present the user with a default directory when they access a file system for saving, retrieving, or viewing file directories. The default directory is either preconfigured by the user or is the most recent directory accessed. The use of a default directory, however, is suboptimal if the number of files becomes large, because the tree becomes deep and it takes more time to access the end of a given branch in order to find a desired document if it is not in the default directory.

In addition, certain applications programs provide a list of the most recently accessed files. While this allows the user to again access the most recently used files, it is frequently the case that the user wishes to access a file in a different directory, which as discussed above, can be cumbersome.

Accordingly, it is desirable to provide a file and directory system in a computer system which provides an enhanced directory or file choice mechanism for accessing files or directories. More particularly, it is desirable to provide a directory system which presents the user with a directory based upon user access patterns over a predetermined period in order to present the user with a directory and/or file listing according to order of most frequent use.

SUMMARY OF THE INVENTION

Accordingly, there is provided a computer system having a hierarchical directory system which analyzes a user's patterns of access or use. The system tracks which directories and files are accessed most frequently by the user when in a particular application. When the user wishes to access a file, the system presents the user with a list of directories or files in order of most likely use, based on the frequency tracking, from the particular application. A file or subdirectory list within a particular directory is also provided in order of most likely to be accessed.

In one embodiment, the file access system according to the present invention employs a computer's operating system file management routine to monitor applications in use, and track accesses to particular directories and files on a per application basis. If the user decides to access a file, the file access system presents the user with its determination of the most likely directory to be accessed based on the respective application in use, and a most frequently used algorithm. Thus, the file access system monitors application use and directory and file use on a per application basis.

Another embodiment of the present invention allows for user configurable parameters to be used in determining which file is most likely to be accessed in conjunction with the most frequently used algorithm. Such parameters include, for example, a user-selectable time base for determining the period over which files and/or directories are accessed. In addition, the user can select a duration of the particular file's use or access such that brief accesses are ignored. Similarly, the file type may be selected and associated with a predetermined set of applications. In addition to selecting the various parameters, the user can also assign a predetermined weighting to any or all of the various parameters or files or applications, thereby weighting the outcome of the determination of which file is most likely to be accessed next.

BRIEF DESCRIPTION OF THE DRAWINGS

A better understanding of the present invention can be obtained when the following detailed description is considered in conjunction with the following in which:

FIG. 1 is a tree diagram illustrating the organizational structure of a typical computer filing system;

FIG. 2 is block diagram of a exemplary computer system configured to implement an embodiment of the present invention;

FIG. 3 is a diagram of an exemplary user interface according to an embodiment of the present invention;

FIG. 4 is a diagram of an exemplary time base select interface according to an embodiment of the present invention;

FIG. 5 is a diagram of an exemplary duration select interface according to an embodiment of the present invention;

FIG. 6 is a diagram of an exemplary type select interface according to an embodiment of the present invention;

FIG. 7 is a diagram of an exemplary weighting select interface according to an embodiment of the present invention;

FIG. 8 is a diagram of an exemplary default select interface according to an embodiment of the present invention;

FIG. 9 is a flowchart illustrating operation of an adaptive computer file directory system according to one embodiment of the present invention; and FIG. 10 is a flowchart illustrating operation of an adaptive computer file directory system according to one embodiment of the present invention.

DETAILED DESCRIPTION OF THE INVENTION

FIG. 2—Exemplary Computer System Having Adaptive File Control

Turning now to FIG. 2, a block diagram illustrating an exemplary computer system which implements an embodiment of the present invention is shown. Computer system 200 includes a central processing unit (CPU) 202. CPU 202 is any of a number of well-known processing units, including those compatible with the X86, Pentium, Pentium Pro, and PowerPC instruction sets. CPU 202 is coupled to a bridge unit 204 which, in turn, is coupled to a main memory or random access memory (RAM) 206. Bridge unit 204 preferably includes a static random access memory (SRAM) used as a cache in accessing memory 206. Bridge unit 204 also interfaces CPU 202 and RAM 206 to expansion bus 208. Expansion bus 208 is any of a number of well-known expansion buses, including those compatible with the Industry Standard Architecture (ISA), the Extended Industry Standard Architecture (EISA), the Microchannel Architecture (MCA), and the Peripheral Component Interconnect (PCI). Expansion bus 208 is preferably a PCI bus.

A variety of peripheral devices are coupled to expansion bus 208. Peripheral device 212 is exemplary of graphics adapters, audio peripherals, motion video peripherals, disk drives and the like. Also coupled to expansion bus 208 is a bus bridge 210 which is used to interface expansion bus 208 to a second expansion bus 214. Expansion bus 214 is any of a number of expansion bus standards and preferably is a bus compatible with the ISA, EISA or MCA bus standards. One or more peripheral devices 216 are coupled to expansion bus 214.

Also coupled to expansion bus 208 is a local area network (LAN) adapter 218. LAN adapter 218 serves to interface the expansion bus 208 with a local area network (LAN) 220. LAN 220 permits computer system 200 to access files in other computer systems, such as servers and the like. Server files and directories are typically organized into actual or virtual disk drives. One embodiment of the present invention is operable to identify which of the server's drives are accessed most often and to provide default access to the corresponding drive.

Also coupled to expansion bus 208 is a Small Computer System Interface (SCSI) adapter 222. SCSI adapter 222 couples expansion bus 208 to a SCSI bus 224. A variety of memory or mass storage devices are coupled to SCSI bus 224. A disk drive 226, a tape drive 228, and a CDROM drive 230 are coupled to SCSI bus 224. Disk drive 226 is either a hard or floppy disk drive. Each of the mass storage devices 226–230 is typically accessible as a separate drive in computer system 200's file directory scheme. As will be described in greater detail below, the adaptive file directory scheme according to one embodiment of the present invention monitors each of the drives, whether on the SCSI bus or via the LAN 220, and determines which drives have been accessed most frequently over a predetermined period. Access to the drives, and the files and directories within them, is then presented according to a most frequently used algorithm. It is noted that the invention is applicable to a variety of computer systems. Thus, FIG. 2 is exemplary only.

FIG. 3—Interface for Configuring Adaptive File System

Turning now to FIG. 3, an interface 300 for setting user configurable options for an adaptive directory system is illustrated. Interface 300 is representative of, for example, a graphical screen accessed via a pull-down menu from an application program such as a word processor or spreadsheet. Alternatively, user interface 300 is representative of a graphical screen accessible from a file directory manager in a computer's operating system. A variety of command buttons for setting user preferences are provided. As shown, time base command button 302, duration command button 304, type command button 306, weighting command button 308, and default command button 310 permit the user to configure the adaptive file directory scheme, as desired, as will be described in greater detail below. Save command button 311 permits the user to save a file management profile. Thus, for example, the user is able to save settings associated, for example, with a particular application.

Interface 300 preferably includes a directory window 301. Directory window 301 includes a drive window 312, listing the drives that are accessible from the program. In the example illustrated, drive window 312 includes disk drives A:-F:. Drives A:-F: are exemplary of real or virtual drives, including floppy disk drives, hard disk drives or partitions, CD-ROM drives, and the like. Directory window 301 further includes a tree window 314 in which a selected drive from drive window 312 and its directories, subdirectories, and files are viewable. Thus, for example, the C: drive is illustrated at root node 316, with a plurality of first level directories or files 318a–318g, descending therefrom. The directories or files are displayed in order according to a predetermined configuration. As illustrated, directory 318a includes files or subdirectories 320a and 320b. A user is able to select drives from drive windows 312 and display the directories, subdirectories and files in window 314. The user is then able to select directories, subdirectories, and files which may be used in the adaptive file directory system. That is, the user is able to select those files which are likely to be more relevant than not. For example, if the user will only be accessing files from drive C:, while using the particular application, he can then click on the C: drive and select all of its directories, subdirectories, and files. If it is desired, the user may additionally click on the C: drive and select particular directories, subdirectories, and files which are to be used by the adaptive file directory system in calculating the most recently used directory or file for presentation.

In addition to being able to change default directories and drives, the user is able to select the time base, duration, file type and weighting as parameters for use by the adaptive file directory system. More particularly, the user is able to select a time base by clicking the time base button 302. The time base may include any predetermined period of time, such as a day, week, month, and the like. The time base is the period over which frequencies of accesses are determined.

In addition, by clicking the duration button 304, the user is able to select the duration that a file or directory must be opened or in use before it is included as an accessed file for purposes of the adaptive file directory scheme. Thus, for example, if a file is opened only momentarily to glance at its contents, the user is able to select a time period, for example, one minute, wherein the access will not be recorded or used in the adaptive file directory algorithm.

The user is also able to select a file type by clicking the file type button 306. The user is able to select the types of files that should be included in his or her file directory system. For example, the user may select only text files (i.e., those ending in the suffix ".txt"), or only word processing documents (i.e., those ending in ".doc").

The user further may select a weighting to be applied by clicking on the "weighting" button 308. Thus, the user is able to bias the algorithm such that, for example, text files (*.txt) are considered to be more likely to be accessed than document files (*.doc). Similarly, files accessed on a particular date may be provided with a user-selectable weighting.

Finally, the user is able to select a default setting by selecting the default button 310. A default setting may either include a predetermined set of variables for use with the adaptive file directory system or may instead use only a most recently used file directory system.

It is noted that a variety of other user configurable weighting options may be provided. Thus, FIG. 3 is exemplary only.

FIG. 4—Exemplary Time Base Interface

Turning now to FIG. 4, an exemplary interface or window 400 for selecting the time base is illustrated. As noted above, the time base is the period over which frequencies of accesses are determined. As illustrated, interface 400 includes a window 402 for entering a numerical period, and a plurality of select buttons 404, 406a–406d, and 408.

Clicking on button 404 selects as a time base the entire period for which the computer has been activated. Time units buttons 406a–406d are used to select a unit of time such as days, weeks, months, or years corresponding to the numerical period entered in window 402. In addition, interface 400 includes a calendar button 408, which, when selected allows the user to choose a calendar period over which the adaptive file directory system is to operate. More particularly, selecting calendar button 408 allows the user to use calendar 410 to select calendar days over which the algorithm is to operate.

FIG. 5—Exemplary Duration Interface

Turning now to FIG. 5, an exemplary duration interface 500 is shown. The duration interface 500 is used to set the amount of time a directory or file must be open or accessed or in use in order to be registered with the adaptive file directory system. Thus, relatively brief accesses to a particular file will not be registered. As illustrated, duration interface 500 includes a minutes window 502 and a seconds window 504 for entering a desired time.

For example, as illustrated, a period of thirty (30) seconds has been entered in seconds window 504. Accordingly, only accesses or uses longer than 30 seconds will be incorporated into the adaptive file directory system.

FIG. 6—Exemplary Type Interface

Turning now to FIG. 6, an exemplary file and source type interface 600 is illustrated.

Interface 600 is used to select the type of files which will be incorporated into the most frequently used algorithm. Interface 600 includes a file type select window 602, a source application select window 603, and an operation type select window 605.

The user may select a file type by clicking on any of the given file types listed in the file type select window 602. As illustrated, these can include any of a variety of file types, including but not limited to text (*.txt), hypertext mark-up language (*.html), executable (*.exe), and WordPerfect (*.wpd) files.

In addition to selecting files by type, the user can select files according to the application which accesses them. For example, by clicking on the source application in the source application select window 603, the user can cause all files called by the particular application to be incorporated into the adaptive file directory system. For example, by clicking on WordPerfect in the menu 603, the user can ensure that all documents called or used by the application are taken into account when determining the most frequently used.

Finally, in one embodiment, the user can select and associate files according to operations on the files. For example, the user can select "Print" in the select operation window 605. Thus, if a user selects a print operation from an application, for example, the files will be presented in order of likelihood of requiring printing: files which are printed frequently will be considered to be more likely to be printed again.

FIG. 7—Exemplary Weighting Interface

Turning now to FIG. 7, a diagram illustrating an exemplary weighting interface is shown. Weighting interface 700 is used to provide a predetermined user-selected weighting to selected files or documents within the adaptive file directory system. More particularly, as illustrated, weighting interface 700 includes a plurality of parameter select windows or buttons 702a–702f.

As shown, files selected on or within a particular day 702a, week 702b, month 702c, or other user-selectable time period via calendar 702d may be assigned a greater weighting in the adaptive file directory algorithm. In addition, files of a particular type 702e and files which have been accessed by a particular application 702f may be selected to have a greater or lesser weighting in the adaptive file directory algorithm.

FIG. 8—Exemplary Default Interface

Turning now to FIG. 8, a diagram illustrating an exemplary default interface window 800 is shown. Default interface 800 includes default select windows 802 and 804, as well as default parameter windows 806a–806d, and retrieve settings button 807. The default interface 800 is used to display the default settings to the user, as well as the ones which the user has selected.

Thus, for example, the user is able to reset the most frequently used file directory system to a more conventional most recently used file system by clicking either the most recently used default select window 802 or the most frequently used default window 804. Similarly, the user is shown the default parameters in parameter windows 806a–806d. The user can change the default adaptive file directory settings as desired. Finally, the user can retrieve a previously saved profile by clicking on the Retrieve settings button 807.

FIG. 9—Flowchart of Adaptive File Directory System

Turning now to FIG. 9, a flowchart 900 is illustrated showing operation of an adaptive file management system according to one embodiment of the present invention. In response to user input, the computer system accesses one or more files which are used with one or more applications (Step 902). For example, clicking on a file identifier in a file manager application typically launches an application program associated with the file. More particularly, clicking on a document file (*.doc) can launch a word processing application, such as WordPerfect, which then uses the file. A file may similarly be accessed (and thereafter used) from within an application, for example, by use of a pull-down menu listing of files. Thus, an application has accessed a file either if the file is accessed directly from the application or if the application is launched when the file is selected from a file manager. A file is in use when it is available to the application for operations, such as viewing, printing or modifying.

The files are preferably arranged in one or more directories. Upon accessing the files, the computer system preferably tracks the directories and/or subdirectories comprising the files that have been accessed (Step 904). This includes, for example, tracking the system of actual and/or virtual drives and directory trees within the particular drive. The access patterns relating to frequencies of access over a particular period of time of the particular files are then recorded (Step 906). Recorded access patterns can include which of the applications has accessed or used a particular file, as well as periods of time over which the files were opened or in use.

Next, an order of the files according to likelihood of accessing based on the recorded access patterns is determined (Step 908), preferably on a per application basis, and preferably according to a most-frequently-accessed determination. Thus, for example, an order is created for the files accessed from and used by a word processing application, according to frequency of use. Similarly, an order is created for the files accessed from a spreadsheet application, according to frequency of use. It is noted, however, that the determination of which files are likely to be accessed next could also occur on a system-wide basis, independently of the particular application.

In addition, in one embodiment, the determination of which file or files are likely to be accessed next occurs on a directory-by-directory basis. Thus, for a given directory, the files and subdirectories therein are ordered according to most frequent use. Alternatively, the directories are ordered in most-likely-to-be-accessed fashion, based on the likelihood of accessing a file stored therein. The files within the directories are similarly ordered. Again, however, it is noted that the determination and ordering could occur on a system-wide basis, independently of the directory hierarchy.

Finally, when a next file is to be accessed, identifiers, such as file icons, are displayed in the order of likelihood of accessing (Step 910) on a video display or monitor coupled within the computer system. The icons or identifiers are preferably usable to select the respective files, such as by clicking with a mouse.

FIG. 10—Flowchart of Adaptive File Directory System

Turning now to FIG. 10, a flowchart illustrating an alternate embodiment of an adaptive file directory system permitting user configurable parameters is illustrated. Upon system initialization (step 1002), the file directory system determines whether to enter a default file directory mode (Step 1004). This may, for example, be a file directory system employing a non-adaptive most recently used method for displaying files or directories. Preferably, however, the default is an adaptive file directory system according to the present invention having preset parameters (Step 1006). However, the user is given the option at any time of resetting the default adaptive file directory system parameters (Step 1008). As noted above, these can include associations between applications programs, duration settings, various weightings, file types, and the like.

Once the user has changed the parameter settings or the system has continued to use the default settings, the computer system accesses one or more files which are used with one or more applications in response to user input (Step 1010). Upon accessing the files, the computer system preferably tracks the directories and/or subdirectories comprising the files that have been accessed (Step 1012). This includes, for example, tracking the system of actual and/or virtual drives and directory trees within the particular drive. The access patterns relating to frequencies of access over a particular period of time of the particular files are then recorded (1014). Recorded access patterns can include which of the applications has accessed a particular file, as well as periods of time over which the files were opened.

Next, an order in which the files are most likely to next be accessed based on the recorded access patterns is determined (Step 1016), preferably on a per application basis, and according to the user selected parameters, if any. As above, for example, an order is created for files accessed from a word processing application. Similarly, an order is created for files accessed from a spreadsheet application. Again, however, the determination of which file or files is likely to be accessed next could also occur on a system-wide basis, independently of the particular application.

In addition, in one embodiment, the determination occurs on a directory-by-directory basis. Thus, files within a given directory are ordered according to most frequent use. Alternatively, directories are ordered in most-likely-to-be-accessed fashion, and files within them are similarly ordered. Again, however, it is noted that the determination and ordering could occur on a system-wide basis, independently of the directory hierarchy.

Finally, icons or identifiers associated with the files are displayed for the user to select in order to access the respective file (Step 1018).

The invention described in the above detailed description is not intended to be limited to the specific form set forth herein, but on the contrary, it is intended to cover such alternatives, modifications, and equivalents as can reasonably be included within the spirit and scope of the appended claims.

We claim:

1. A method for accessing files in a computer system, comprising:

accessing one or more files which are used with one or more applications, wherein said accessing is performed based on user input, wherein said files are comprised in one or more directories;

tracking said one or more directories comprising said one or more files being accessed;

recording access patterns relating to frequencies of access of said one or more files;

determining an order of said one or more files according to said frequencies of access of said one or more files, wherein said one or more files are determined to be accessed if one or more predetermined user configurable criteria related to said one or more files are met; and displaying identifiers associated with said one or more files according to said order, said identifiers being usable to selectively access said one or more files for use with said one or more applications.

2. A method for accessing files in a computer system, comprising:

accessing one or more files which are used with one or more applications, wherein said accessing is performed based on user input, wherein said files are comprised in one or more directories;

tracking said one or more directories comprising said one or more files being accessed;

recording access patterns relating to frequencies of access of said one or more files wherein said one or more files are determined to be accessed if one or more predetermined user configurable criteria related to said one or more files are met;

determining an order of said one or more files according to likelihood of access based on said access patterns; and displaying identifiers associated with said one or more files according to said order, said identifiers being usable to selectively access said one or more files for use with said one or more applications;

wherein said determining an order of said one or more files comprises determining which of said one or more files have been most frequently accessed.

3. The method for accessing files in a computer system of claim 2, wherein said determining which of said one or more files have been most frequently accessed occurs on a directory-by-directory basis.

4. The method for accessing files in a computer system of claim 2, further comprising determining an order of said directories according to likelihood of a file comprised therein being accessed.

5. A computer system, comprising:
a processing unit;
one or more memory devices operably coupled to said processing unit and configured to store one or more files in one or more directories; and
a display device,
wherein said processing unit is configured to
access said one or more files which are used with one or more applications;
track said one or more directories comprising said one or more files being accessed;
record access patterns relating to frequencies of access of said one or more files;
determine an order of said one or more files according to said frequencies of access of said one or more files, wherein said one or more files are determined to be accessed if one or more predetermined user configurable criteria related to said one or more files are met; and
display identifiers on said display device associated with said one or more files according to said order, said identifiers being usable to selectively access said one or more files.

6. A computer system, comprising:
a processing unit;
one or more memory devices operably coupled to said processing unit and configured to store one or more files in one or more directories; and
a display device,
wherein said processing unit is configured to access said one or more files which are used with one or more applications;
track said one or more directories comprising said one or more files being accessed;
record access patterns relating to frequencies of access of said one or more files wherein said one or more files are determined to be accessed if one or more predetermined user configurable criteria related to said one or more files are met;
determine an order of said one or more files according to likelihood of access based on said access patterns; and
display identifiers on said display device associated with said one or more files according to said order, said identifiers being usable to selectively access said one or more files, wherein said processing unit is configured to determine which of said one or more files have been most frequently accessed.

7. A method for accessing files in a computer system, comprising:
accessing one or more files, wherein said accessing is performed based on user input;
recording access patterns relating to frequencies of access of said one or more files;
determining an order of said one or more files according to which of said one or more files have been most frequently accessed, wherein most frequently accessed ones of said one or more files have a greater likelihood of access wherein said one or more files are determined to be accessed if one or more predetermined user configurable criteria related to said one or more files are met; and
displaying identifiers associated with said one or more files according to said order, said identifiers being usable to selectively access said one or more files.

8. A method for accessing directories in a computer system comprising:
accessing one or more directories;
recording access patterns relating to frequencies of access of said one or more directories;
determining an order of said one or more directories according to which of said one or more directories have been most frequently accessed, wherein most frequently accessed ones of said one or more directories have a greater likelihood of access, wherein said one or more files are determined to be accessed if one or more predetermined user configurable criteria related to said one or more files are met; and
displaying identifiers associated with said one or more directories according to said order, said identifiers being useable to selectively access said one or more directories.

9. A method for accessing directories in a computer system comprising:
accessing one or more directories;
recording access patterns relating to frequencies of access of said one or more directories;
determining an order of said one or more directories according to likelihood of access based on said access patterns, wherein most frequently accessed ones of said one or more directories have a greater likelihood of access, wherein said one or more files are determined to be accessed if one or more predetermined user configurable criteria related to said one or more files are met; and
displaying identifiers associated with said one or more directories according to said order, said identifiers being useable to selectively access said one or more directories, wherein said frequencies of access of said one or more directories includes frequencies of access of said one or more files within said one or more directories.

10. A system for accessing a computer system comprising:
means for accessing one or more directories;
means for recording access patterns relating to frequencies of access of said one or more directories;
means for determining an order of said one or more directories based on frequencies of access of said one or more directories, wherein more frequently accessed ones of said one or more directories have a greater likelihood of access, wherein said one or more files are determined to be accessed if one or more predetermined user configurable criteria related to said one or more files are met; and
means for displaying identifiers associated with said one or more directories according to said order, said identifiers being useable to selectively access said one or more directories.

11. A system for accessing a computer system comprising:
means for accessing one or more directories;
means for recording access patterns relating to frequencies of access of said one or more directories;
means for determining an order of said one or more directories according to likelihood of access based on said access patterns, wherein most frequently accessed ones of said one or more directories have a greater likelihood of access, wherein said one or more files are determined to be accessed if one or more predetermined user configurable criteria related to said one or more files are met; and means for displaying identifiers associated with said one or more directories according to said order, said identifiers being useable to selectively access said one or more directories, wherein said one or more directories include one or more file and said frequencies of access of said one or more directories include frequencies of access of said one or more files within said one or more directories.

* * * * *